(12) United States Patent
Meunier et al.

(10) Patent No.: US 7,634,353 B2
(45) Date of Patent: Dec. 15, 2009

(54) METHOD AND DEVICE FOR AIDING THE FLOW OF A CRAFT ON THE SURFACE OF AN AIRPORT

(75) Inventors: Hugues Meunier, Frouzins (FR); Nicolas Marty, Saint Sauveur (FR)

(73) Assignee: Thales, Neuilly-sur-Seine (FR)

( * ) Notice: Subject to any disclaimer, the term of this patent is extended or adjusted under 35 U.S.C. 154(b) by 422 days.

(21) Appl. No.: 11/529,314

(22) Filed: Sep. 29, 2006

(65) Prior Publication Data

US 2007/0078591 A1    Apr. 5, 2007

(30) Foreign Application Priority Data

Sep. 30, 2005    (FR) .................................. 05 10015

(51) Int. Cl.
*G01C 21/00* (2006.01)
*G06F 17/00* (2006.01)
(52) U.S. Cl. ............................. 701/120; 701/3; 701/300
(58) Field of Classification Search ......... 701/117–122, 701/3, 200–213, 300, 301; 340/947–961
See application file for complete search history.

(56) References Cited

U.S. PATENT DOCUMENTS

| | | |
|---|---|---|
| 5,268,698 A | 12/1993 | Smith, Sr. et al. |
| 5,687,149 A | 11/1997 | Meunier |
| 6,088,654 A | 7/2000 | Lepere et al. |
| 6,317,663 B1 | 11/2001 | Meunier et al. |
| 6,480,120 B1 | 11/2002 | Meunier |
| 6,606,563 B2 | 8/2003 | Corcoran, III |
| 6,927,701 B2 * | 8/2005 | Schmidt et al. ............. 340/959 |
| 7,120,540 B2 | 10/2006 | Meunier |
| 7,321,813 B2 | 1/2008 | Meunier |
| 7,437,250 B2 * | 10/2008 | Breen et al. .................... 702/34 |
| 7,479,925 B2 * | 1/2009 | Schell ......................... 342/455 |
| 2003/0107499 A1 | 6/2003 | Lepere et al. |
| 2005/0171654 A1 | 8/2005 | Nichols et al. |

(Continued)

FOREIGN PATENT DOCUMENTS

| | | |
|---|---|---|
| WO | 03 107299 A | 12/2003 |
| WO | WO 2005/095888 | 10/2005 |

OTHER PUBLICATIONS

Sharon Otero Beskenis et al., "Integrated Display System for Low Visibility Landing and Surface Operations", Jul. 1998, NASA/CR-1998-208446.

*Primary Examiner*—Richard M. Camby
(74) *Attorney, Agent, or Firm*—Lowe Hauptman Ham & Berner, LLP

(57) ABSTRACT

The invention relates to aiding airport navigation by emission of an alert reminding the pilot of a craft moving on the surface of an airport of the circulation constraints encountered locally over his route. The method comprises the following steps: partitioning of the circulation surfaces of the airport into elementary circulation constraint zones each enclosing a set of adjoining points subject to the same local circulation constraints, identifications of the elementary zones and of their specific circulation constraints, detection of the encroachment of the craft into the elementary zones, and upon each encroachment of the craft into an elementary zone, reminder by alert generation, to the commander of the craft, of one at least of the circulation constraints specific to the elementary zone concerned.

10 Claims, 7 Drawing Sheets

U.S. PATENT DOCUMENTS

| | | |
|---|---|---|
| 2007/0031007 A1 | 2/2007 | Bitar |
| 2007/0050101 A1 | 3/2007 | Sacle et al. |
| 2007/0053609 A1 | 3/2007 | Bitar et al. |
| 2007/0078592 A1 | 4/2007 | Meunier et al. |
| 2007/0150117 A1 | 6/2007 | Bitar et al. |
| 2007/0150121 A1 | 6/2007 | Bitar et al. |
| 2007/0174005 A1 | 7/2007 | Bitar et al. |
| 2007/0185652 A1 | 8/2007 | Salmon et al. |
| 2007/0219705 A1 | 9/2007 | Bitar et al. |
| 2007/0276553 A1 | 11/2007 | Bitar et al. |

* cited by examiner

METHOD AND DEVICE FOR AIDING THE FLOW OF A CRAFT ON THE SURFACE OF AN AIRPORT

RELATED APPLICATION

The present application is based on, and claims priority from, France Application Number 05 10015, filed Sep. 30, 2005, the disclosure of which is hereby incorporated by reference herein in its entirety.

BACKGROUND OF THE INVENTION

1. Field of the Invention

The present invention relates to the assisting of an airport craft (vehicle, aircraft) to comply with taxiing constraints. It more particularly pertains to the detection and the signalling, to an airport craft, of the local circulation constraints related to the situation of the craft in the ground traffic of an airport.

2. Description of the Related Art

Since the sizeable reduction in air accidents due to a collision with the ground of an aircraft that is still manoeuvring, so-called CFIT-type accidents (the acronym standing for the expression: "Controlled Flight Into Terrain"), obtained with TAWS ground collision prevention systems (the acronym standing for the expression: "Terrain Awareness and Warning System), the main cause of air accidents is now becoming airport collisions on the ground between aeroplanes or other craft.

The main reason for these ground traffic accidents in airports, commonly known by the expressions "Runway Incursion" or "Runway Intrusion", is the unauthorized encroachment of a craft onto a traffic lane (runway, taxiway, parking area, etc.). Such unauthorized encroachments which inevitably give rise to risks of collision with possible aeroplanes taxiing or taking off or landing are, in essence, the consequence of a noncompliance (in large part through inattentiveness) with the taxiing authorizations provided by the airport or air traffic control authorities.

The continuous increase in air traffic and the growing complexity of the network of airport traffic lanes are favouring these risks of intrusion even more.

According to the rules currently in force, the taxiing of a craft on an airport is performed on request and by the commander of the craft, but according to the authorizations provided by the airport or air traffic control authorities in charge of ensuring the organized and safe circulation of ground movements. The commander of the craft taxies his craft freely within the framework of the authorizations obtained.

Hitherto, the surveillance of airport surface taxiing movements and of their compatibility with the authorizations granted has been performed visually by the airport or air traffic control authorities, very often with the aid of surveillance systems, based for the most part, on airport surface ground surveillance radars, and possibly supplemented in the last few years with multi-lateration ground systems using the data originating from onboard transponders.

On the basis of visual checking and of the position information provided by these airport surface ground surveillance systems, the airport or air traffic control authorities formulate, for the various craft, taxiing authorizations that are valid up to a so-called reporting point, where the craft must wait and obtain a new authorization to perform a new movement, doing so until it reaches its final destination.

The taxiing authorizations and their characteristics (route, compulsory reporting point) are very widely provided by speech (typically via a VHF radio channel). Hitherto, they have been taken into account mentally by the commander of the craft and rarely inserted into onboard systems.

Recently at a few airports and with a few airlines, these instructions may be provided to the aircraft by digital transmission by means of onboard equipment of the CPDLC type (the acronym standing for the expression: "Controller-Pilot Data Link Communications") in the form of standardized messages such as a PDC message (the acronym standing for the expression: "PreDeparture Clearances") via a VHF radio channel. The instructions are then displayed on an onboard screen (or even printed on board), but in general not inserted at the level of the other onboard systems. Such an insertion is nevertheless conceivable, at the very least manually, with the aid or otherwise of predefined lists of routes.

The reporting points marking the conclusions of the legs associated with the taxiing authorizations, also known by various names such as "Stop-bars" or "Holding points", "taxiway holding positions", "taxiway intersection markings", etc., are systematically placed at the thresholds of the crossings of the runways and of the taxiways but they may also be placed elsewhere in the traffic lanes of an airport.

Taxiing being left to the free initiative of the commander of the craft up to the reporting point, noncompliance (principally through inattentiveness) with the reporting point or with the route assigned may give rise to the abovementioned risks of "Runway Incursion" or "Runway Intrusion".

Hitherto, no operational system has been available on board an aircraft to aid the pilot to follow the route assigned to him by ground control and especially to signal to him any crossing of a compulsory reporting point that may or may not have been assigned to him (for example following a route error). Such functions are ensured only at the ground control level whereas they would be very useful on board a craft for assisting the commander of the craft to follow the routes corresponding to the taxiing authorizations.

The literature mentions various experiments conducted with a view to formulating onboard equipment facilitating the piloting of an aircraft during its taxiing on the surface of an airport especially in case of poor visibility. The article by Sharon Otero Beskenis et al., entitled "Integrated Display System For Low Visibility Landing and Surface Operations" published in July 1998 under the reference NASA/CR-1998-208446 describes an experiment with a Boeing B-757-type aircraft equipped with an HDD head-down display exhibiting a dropdown map of the airport pinpointing the aircraft on the traffic lanes of the airport by utilizing a geographical location fix delivered by a differential satellite positioning system and an electronic map of the airport, portraying the taxiing leg assigned to the aircraft by the airport traffic control authorities, the reporting points delimiting the taxiing authorizations as well as reporting points transmitted by a runway anti-intrusion ground system dubbed AMASS (the acronym standing for the expression: "Airport Movement Area Safety System").

These conclusive experiments have had no immediate repercussion on account of the high level of equipment required for the ground installations of the airport. Since then, simpler systems have been proposed, rendering a less complete service but not necessitating particular equipment for the airport.

U.S. Pat. No. 6,606,563 describes an alert system charting, by GPS positioning, the position of an aircraft on an airport surface modelled in an electronic map, estimating the distance separating it from the runways and signalling to the pilot any approach to or encroachment onto a runway. This system which is a less secure variant of the AMASS system draws the pilot's attention to the fact that he is approaching or encroaching onto a runway but does not aid him when taxiing to follow the route assigned to him by the airport traffic control authorities.

SUMMMARY OF THE INVENTION

In view of the foregoing it is an object of this invention to signal to of a craft moving on the surface of an airport, an incompatibility of the situation of the craft with circulation constraints of the airport so as to allow the craft to discard poor choices of route. Among the incompatibilities in relation to circulation constraints that may be signalled to a craft such as an aircraft, are:

- an abnormal situation or excessive proximity in relation to an element of the airport, such as air terminals, boarding gates, runways, taxiways,
- an incompatibility of the characteristics of an element of the airport, in particular of a traffic lane, runway or taxiway or parking area in relation to those of the aircraft, for example, maximum authorized weight and width or of the movement of the aircraft, for example, direction of travel, maximum authorized speed.

Briefly stated, the present invention is directed to a method for aiding the circulation of a craft on the surface of an airport comprising circulation constraint zones, the said craft being provided with a geographical locating equipment and with a cartographic database cataloguing the circulation surfaces of the airport and the associated local circulation constraints, noteworthy in that it comprises the following steps:

- partitioning of the circulation surfaces of the airport into elementary circulation constraint zones each enclosing a set of adjoining points subject to the same local circulation constraints,
- identifications of the elementary zones and of their specific circulation constraints,
- detection of the encroachment of the craft into the elementary zones, done by likening the craft to a girth surface encompassing its current position and by searching for the intersections of this girth surface with the set of elementary zones of the circulation surfaces of the airport, and
- upon each encroachment of the craft into an elementary zone, reminder, to the commander of the craft, of one at least of the circulation constraints specific to the elementary zone concerned.

Advantageously, the sensitivity of the detection is adjusted by means of a threshold dependent on the magnitude of the intersection surface.

Advantageously, the search for the intersections of the girth surface of the craft with the elementary zones is done by charting the girth surface and the elementary zones on one and the same geographical locating grid and by searching for the existence of a mesh cell of the grid common to the girth surface and to an elementary zone.

Advantageously, when the search for the intersections of the girth surface of the craft with the elementary zones is done by charting the girth surface and the elementary zones on one and the same geographical locating grid and searching for a mesh cell of the grid common to the girth surface and to an elementary zone, a minimum number of common mesh cells is taken as threshold of detection of encroachment of the craft into an elementary zone.

Advantageously, an elementary circulation constraint zone is identified by the most restrictive circulation constraint affecting it.

Advantageously, the circulation constraints taken into account include several levels of severity of prohibition.

Advantageously, certain circulation constraints taken into account take account of the characteristics of the craft.

Advantageously, the shape and the dimensions of the girth surface take account of the movement of the craft.

Advantageously, the shape and the dimensions of the girth surface take account of the uncertainties in the determination of the position and of the heading of the craft.

The invention is also directed to a device for aiding the circulation of a craft on the surface of an airport comprising circulation constraint zones, the said craft being provided with a geographical locating equipment and with a geographical database cataloguing the circulation surfaces of the airport and the associated circulation constraints, noteworthy in that it comprises a computer:

- formulating, on the basis of the elements of the database, a partitioning of the circulation surfaces of the airport into elementary circulation constraint zones each enclosing a set of adjoining points subject to the same local circulation constraints,
- identification of the elementary zones and of their specific circulation constraints,
- detection of the encroachment of the craft into the elementary zones, and
- upon each encroachment of the craft into an elementary zone, reminder, to the commander of the craft, of one at least of the circulation constraints of the elementary zone concerned.

BRIEF DESCRIPTION OF THE DRAWINGS

Other characteristics and advantages of the invention will emerge from the description hereafter, of an embodiment given by way of example. This description will be offered in relation to the drawing in which.

DETAILED DESCRIPTION OF THE EMBODIEMENTS

The circulation constraints on the surface of an airport are enacted by the authority managing the airport. They must be considered in the wide sense. They may be physical in nature such as for example the fact that an aircraft cannot pass through a building or approach it too closely. They may be regulatory in nature, such as for example a direction of traffic. They may be specific to a category of craft, the areas of traffic in respect of aircraft, service vehicles and pedestrians being as far as possible separated on the surface of an airport for obvious safety reasons or even reasons specific to a type of craft, two types of aircraft not having the same requirements as regards leeway, ground resistance to the taxiing load, etc. They may be of an absolute character such as a weight limitation or a compulsory direction of traffic for a taxiway or a parking area or be of a relative character and be lifted on authorization from the traffic control authority as is the case for an airport runway which is normally prohibited to any traffic without express authorization from the control tower. Finally, they may consider several levels of severity of prohibition taking account of the significance of the risk of an accident in case of transgression. For example, any presence of a craft on an airport runway, its immediate environment and its access thresholds is prohibited without express authorization from the airport traffic control authority, but the risk of an accident is much more significant for a presence on the runway strip which is allowed for in respect of taxiing on takeoff or on landing than in the immediate neighbourhood of this strip or simply slightly beyond a runway entrance threshold.

Figure 1:
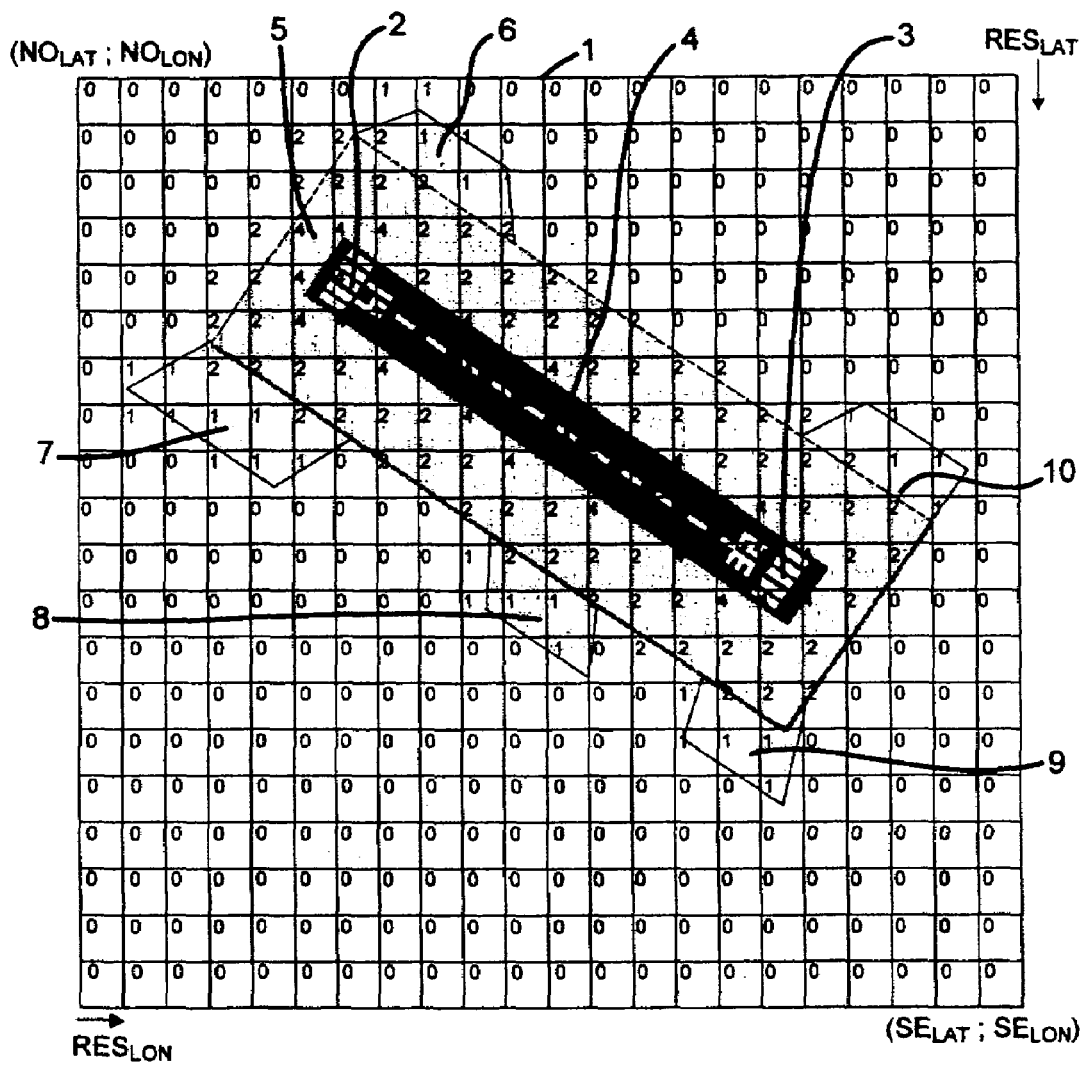
FIG. 1 shows an exemplary partitioning of an airport runway and of its immediate neighbourhood into elementary zones pinpointed by means of a geographical locating grid.

The local circulation constraints which are associated with the circulation surfaces of an airport are used to partition the circulation surfaces into elementary zones, all of whose points are subject to the same set of local circulation constraints FIG. 1 shows an exemplary partitioning of an airport runway and of its immediate environment into three types of elementary zones:

a first elementary zone of type a for the track 4 allowed for in respect of taxiing of aircraft on takeoff and on landing. This track is subject to a circulation prohibition whose transgression without permission from the airport traffic control authority induces a very significant risk of accident, a second elementary zone 5 of type b for the immediate neighbourhood of the track 4 allowed for in respect of taxiing on takeoff and on landing which is also subject to a circulation prohibition but transgression of which without permission from the airport traffic control authority induces only a severe risk of accident, and elementary zones of type c for the access thresholds 6, 7, 8, 9, 10 of the taxiways which are also subject to a crossing prohibition but transgression of which without permission from the airport traffic control authority induces only an average risk of accident if it does not continue further.

The set of elementary zones 4 to 10, and, more generally, the set of elementary zones of the circulation surfaces of an airport are mapped by means of one and the same geographical locating grid which may be:

a grid regular distance-wise, aligned with the meridians and parallels, a grid regular distance-wise aligned with the heading of the aircraft, a grid regular distance-wise aligned with the course of the aircraft, a grid regular angular-wise, aligned with the meridians and parallels, a grid regular angular-wise, aligned with the heading of the aircraft, a grid regular angular-wise aligned with the course of the aircraft, a polar (radial) representation centred on the aircraft and its heading, a polar (radial) representation centred on the aircraft and its course.

Typically, the grid is composed of a set of polygons with 4 sides, conventionally squares or rectangles, but the grid may also be described by other types of polygons such as triangles or hexagons.

Subsequently in the description, use is made of a locating grid 1 regular distance-wise, aligned with the meridians and parallels, and defined by its north-west ($NW_{LAT}$ and $NW_{LON}$) and south-east ($SE_{LAT}$, $SE_{LON}$) corners, with as angular resolution, $RES_{LAT}$ on the latitude axis and $RES_{LON}$ on the longitude axis.

In the figures, the proportions between the mesh cells of the locating grid and the surface areas of the zones represented are not complied with, with a view to improving readability.

The mesh cells of the geographical locating grid make it possible to pinpoint by their positions within the rows and columns of the grid the points of the various elementary circulation constraint zones. As represented in FIG. 1, they are assigned two quantities:

a binary quantity of membership or non-membership in an elementary zone subject to one or more local circulation constraints, a binary value 1 pinpointing the mesh cells included in whole or in part in an elementary zone and a binary value 0 pinpointing the mesh cells outside of any elementary zone. This binary membership quantity appears in the bottom-right corner of each mesh cell, and a categorial quantity a, b, c allocated only to the mesh cells included in whole or in part in the elementary zones, pinpointing the set of circulation constraints in force locally and, possibly, an identity of the elementary membership zone. This categorial quantity appears in the top-left corner of the mesh cells intercepting or included in elementary zones.

When a mesh cell of the locating grid is shared between two types of elementary zones, it is assigned entirely to the elementary zone having the severest local circulation constraint or constraints. Thus, in the example illustrated in FIG. 1, a mesh cell of the locating grid shared between the elementary zone of type a 4 and the elementary zone of type b 5 is assigned entirely to the elementary zone of type a 4, a mesh cell of the geographical locating grid shared between the elementary zone of type b 5 and an elementary zone of type c 6 to 10 is assigned entirely to the elementary zone of type b 4.

The partitioning into elementary circulation constraint zones, of the circulation surfaces of an airport extends to the whole of the surface of the airport zone (runways, taxiways, buildings, etc.) in which an aircraft or a service vehicle may be required to move. It is stored by way of the quantities assigned to the mesh cells of the geographical locating grid which are stored in a cartographic database on board or consultable by radio transmission. For an aircraft, the cartographic database advantageously contains the partitionings into elementary zones of the circulation surfaces of all the airports that it is required to frequent.

The partitioning into elementary zones of the circulation surfaces of an airport is updated regularly and in the event of significant modification of the circulation regulations enacted by the ground traffic control authority. It can also be updated as a function of the taxiing authorizations, if the latter are communicated to the craft by digital transmission. The local circulation constraint reminders given to the commander of a craft travelling on the surface of an airport can thus be limited to what is strictly necessary.

The local circulation constraints which the commander of a craft moving on the circulation surfaces of an airport is to be reminded of are deduced from the situation of the craft or rather a girth surface plotted around it with respect to the partitioning into elementary zones of the circulation surfaces of the airport.

Figure 2:
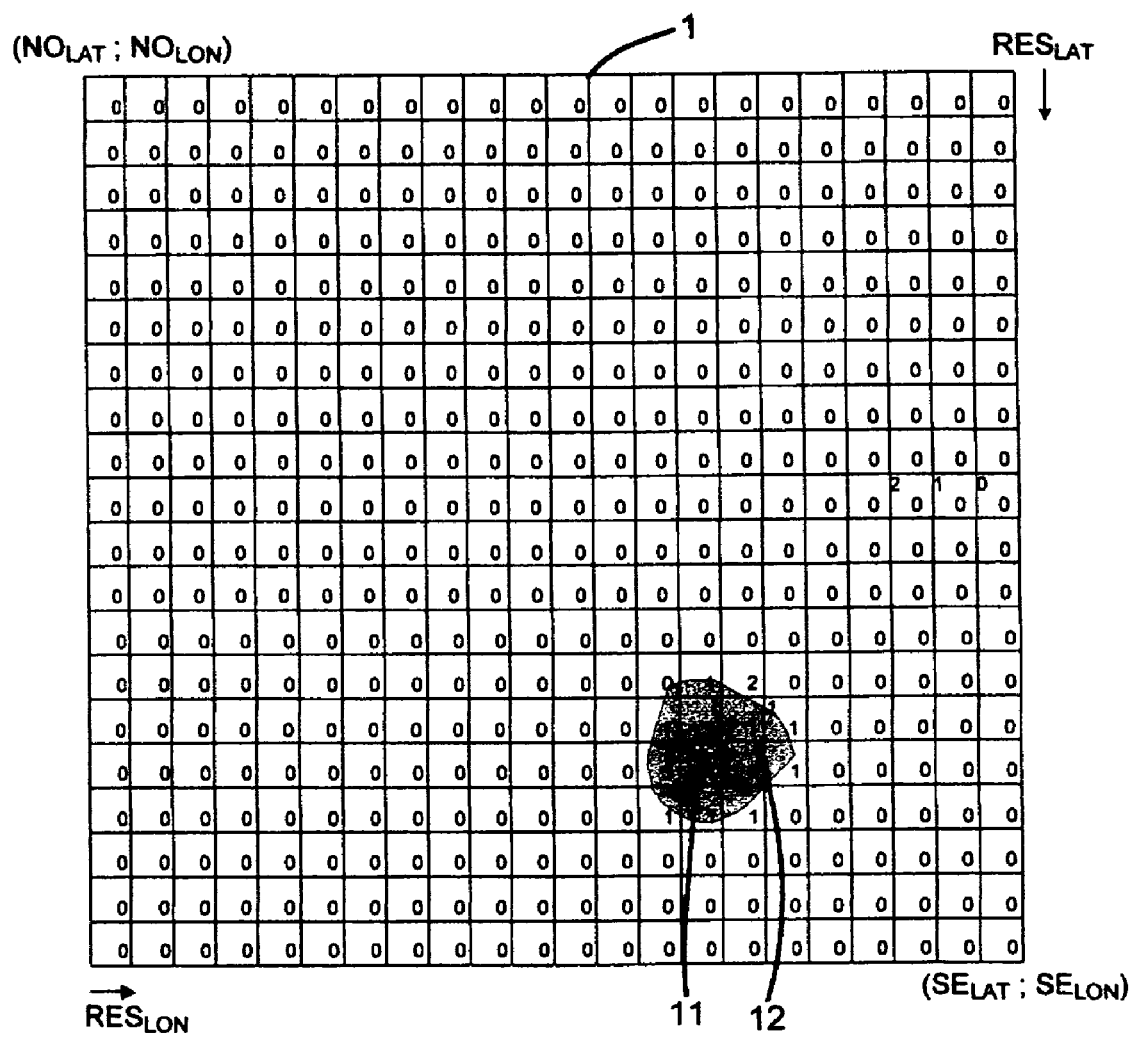
FIG. 2 shows an exemplary girth surface related to an aircraft and pinpointed by means of the same locating grid as that used in FIG. 1.

FIG. 2 shows an exemplary girth surface 12 related to an aircraft 11 and sampled by means of the same geographical locating grid 1 as the elementary circulation constraint zones 4 to 10 of FIG. 1. The girth surface 12 is pinpointed on the geographical locating grid, like the elementary circulation constraint zones 4 to 10 by a binary membership quantity that equals 1 for the mesh cells of the geographical locating grid belonging to it in whole or part and 0 for the mesh cells of the locating grid not belonging to it.

The contour, which is related to the aircraft 11, of the girth surface 12, is established as a function of the instantaneous position of the aircraft 11, of its short-term forecastable position, of its heading and possibly of its speed. It is periodically updated to take account of the movement of the aircraft 11.

Figure 3:
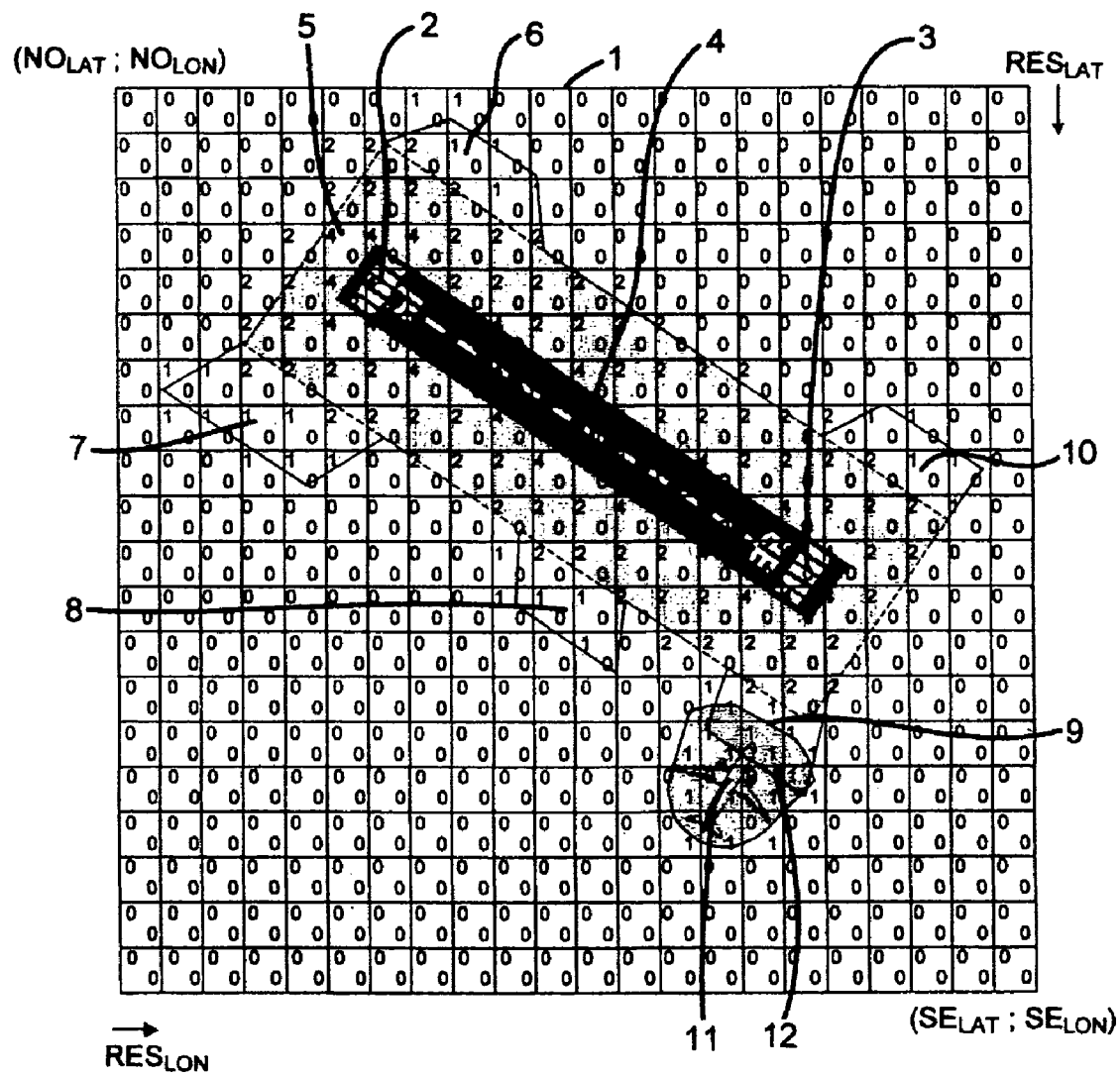
FIG. 3 is a superposition of FIGS. 1 and 2 illustrating a way of detecting the encroachments of the craft into the elementary zones in accordance with the method according to the invention.

As shown in FIG. 3, the situation of a craft 11 in the ground traffic circulation of an airport is deduced from the superposition of the girth surface 12 related to it, with the partition into elementary circulation constraint zones 4 to 10 of the circulation surfaces of the airport on which it is presumed to be located, the girth surface 12 and the elementary zones 4 to 10 being referred to the same geographical locating grid. The comparison, for each mesh cell of the geographical locating grid, of the binary quantity of membership in the girth surface 12 with the binary quantity of membership in an elementary circulation constraint zone 4 to 10 advises as to the encroachment of the girth surface and therefore of the craft into one or more circulation constraint zones. The fact that the two binary membership quantities of a mesh cell of the geographical locating grid are at the level 1, demonstrates that there is intersection between the girth surface 12 and an elementary circulation constraint zone 4 to 10. The number of mesh cells of the geographical locating grid having their two binary membership quantities, the binary quantity of membership in the girth surface 12 and the binary quantity of membership in an elementary circulation constraint zone 4 to 10 at the level 1 gives an indication as to the significance of the encroachment of the craft into an elementary circulation constraint zone which becomes complete when the number of these mesh cells attains that of the mesh cells contained in the girth surface 12. It can therefore be used to establish a threshold of sensitivity of detection of encroachment of the craft into an elementary circulation constraint zone.

Figure 4:
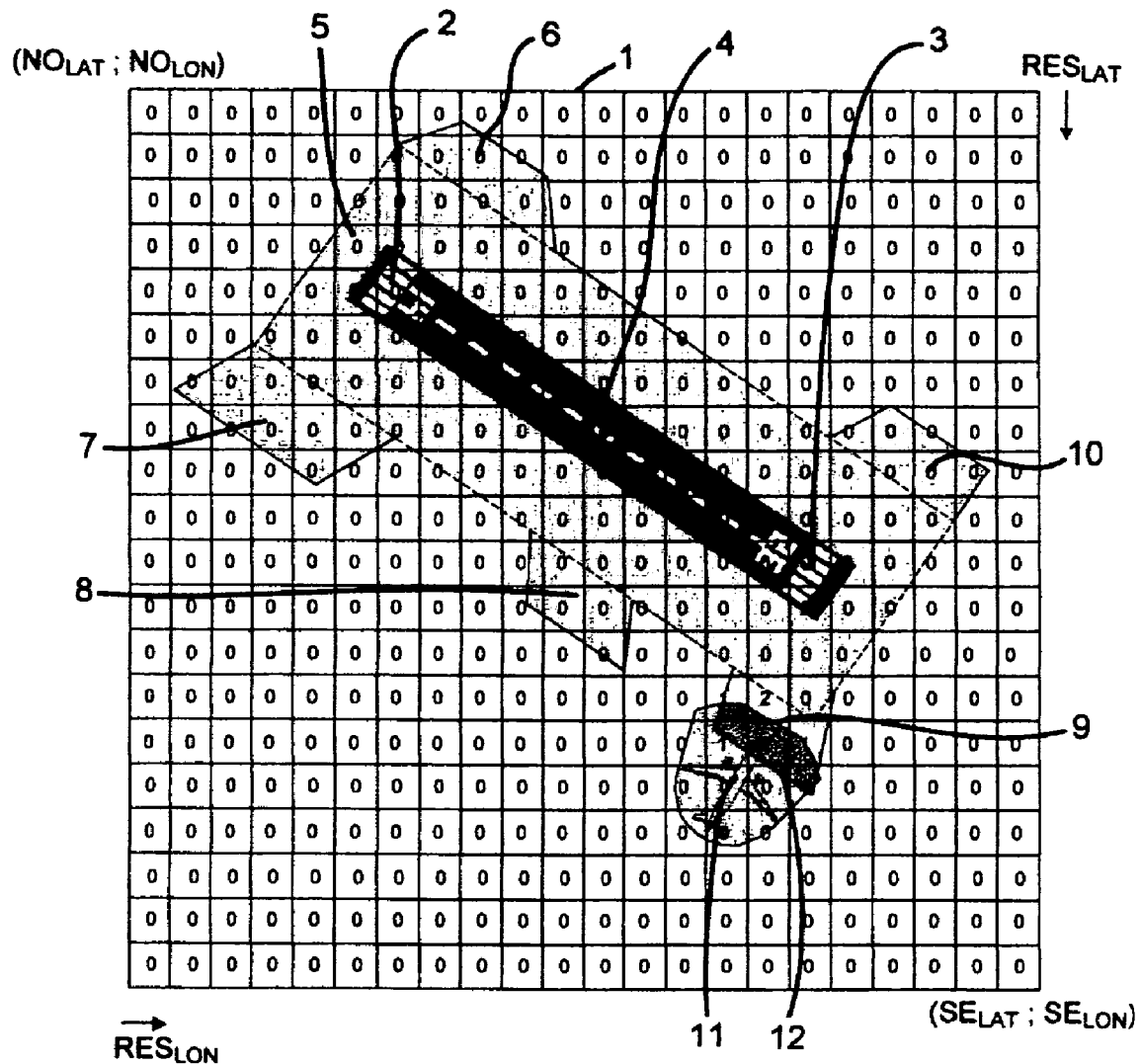
FIG. 4 is an advancement of FIG. 3 illustrating the enumeration of the mesh cells of the geographical locating grid common to the girth surface and to an elementary zone on which is based a criterion of sensitivity of detection of the encroachments of the craft into elementary zones.

FIG. 4 depicts, by the application of an "exclusive or" logic operation, the mesh cells of the geographical locating grid exhibiting binary quantities of membership in the girth surface 12 and in the elementary zones 4 to 10 at the level 1.

Figure 5:
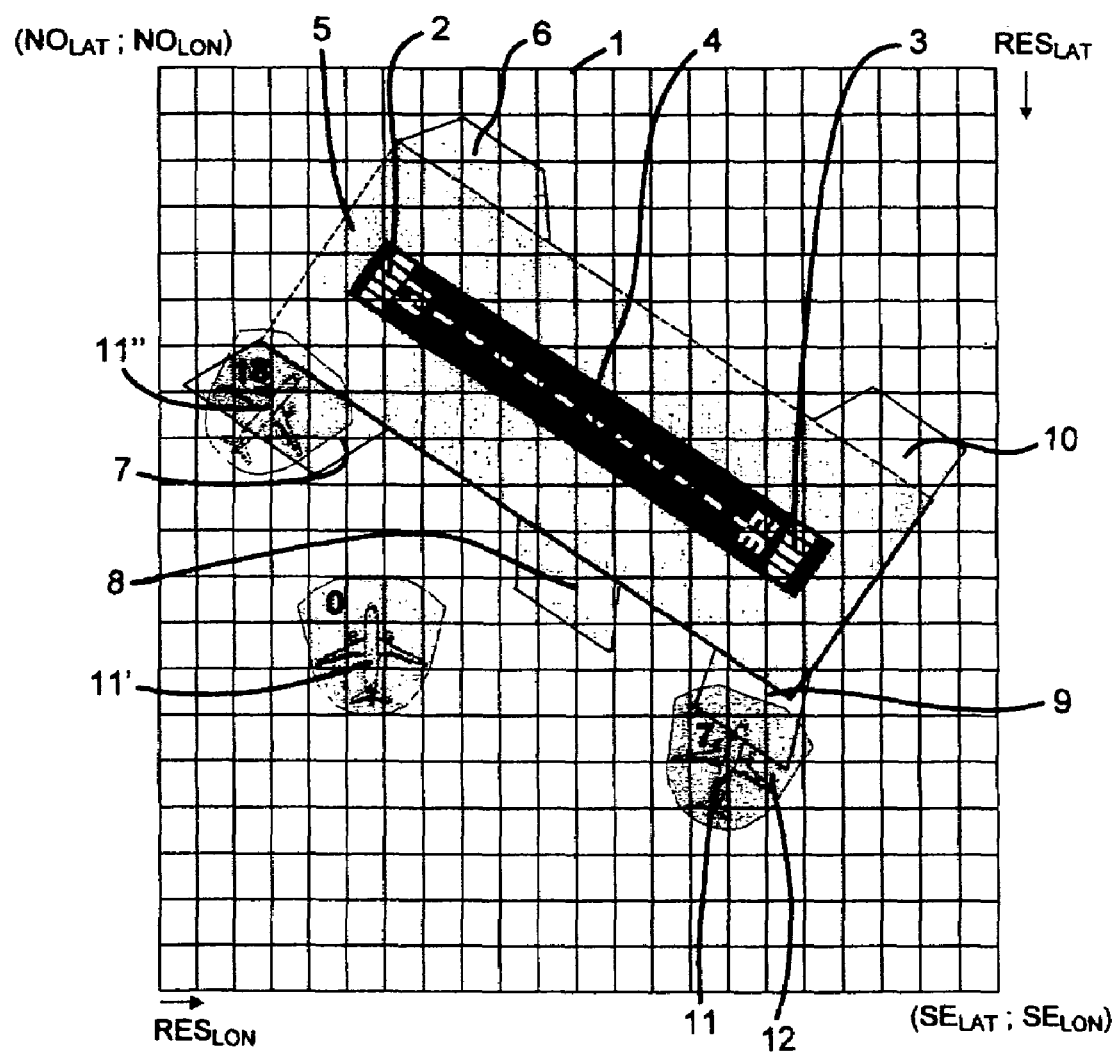
FIG. 5 is a variant of FIG. 3 showing the dependance of the criterion of sensitivity of detection of the encroachments of the craft into elementary zones in relation to the relative position of the craft.

FIG. 5 shows, for various situations of an aircraft 11, 11', 11", the enumerations of the mesh cells of the geographical locating grid endowed with the two binary quantities of membership at the value 1. This enumeration equals 6 for the situation of FIG. 3 where an aircraft 11 is nearing an elementary circulation constraint zone 9 corresponding to a runway threshold, assigned a categorial quantity c. It equals 8 or 4 for the situation of an aircraft 11' having crossed a runway threshold and nearing the immediate environment of the track allowed for in respect of taxiing on takeoff or on landing, 8 if we consider the elementary circulation constraint zone 7 corresponding to the runway threshold itself, and assigned the categorial quantity c or 4 if we consider the elementary circulation constraint zone 5 corresponding to the track's immediate environment allowed for in respect of taxiing assigned the categorial quantity b. It equals 0 for the situation of the aircraft 11" distant from any elementary circulation constraint zone.

In the situation of the aircraft 11' where two enumerations are possible, the enumeration taken into account as a priority is that 4b relating to the elementary zone assigned the severest set of local circulation constraints, here the elementary zone 5 covering the immediate neighbourhood of the track 4 allowed for in respect of taxiing on takeoff and on landing. If it is not employed, as a consequence of a detection sensitivity threshold higher than its value, the other enumeration 8c is taken into account in its turn.

Enumeration thresholds are established for each category a, b, c of elementary zone with local circulation constraint and serve as criteria of detection of encroachment of the craft into the various elementary zones 4 to 10. Their overshooting engenders the generation aboard the craft of an alert reminding the commander of the craft of the set of circulation constraints locally in force. As indicated previously, false alerts can be minimized by updates of the partitioning into elementary zones of the circulation surfaces of the airport taking account of the taxiing authorizations delivered by the ground traffic control authority, and this may be done by an acknowledgment on the part of the commander of the craft, or in an automatic manner when the taxiing authorizations are communicated to the craft by digital transmission.

Figure 6:
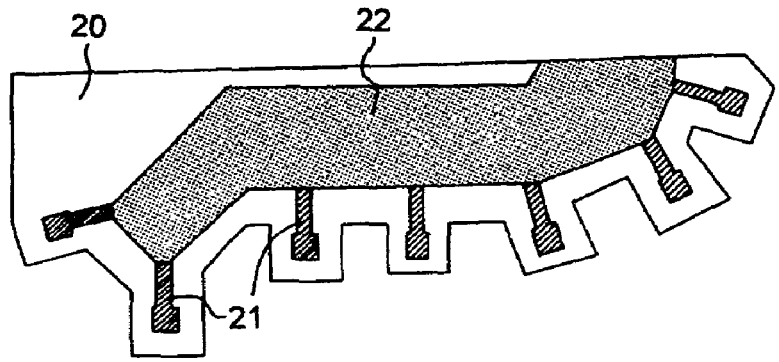
FIG. 6 shows an exemplary partitioning into elementary zones, of a passenger boarding terminal of an airport.

FIG. 6 shows an exemplary partitioning into elementary local circulation constraint zones of an airport terminal for the boarding of passengers. This partitioning is composed:

of a first category of elementary zone 20 which corresponds to the surface of the permanent building of the terminal and which is subject to a total circulation prohibition not tolerating any exception since non-compliance therewith inevitably leads to an accident, of a second category of elementary zones 21 which corresponds to the swing spaces of the movable gangways for accessing the aircraft from the building of the terminal and which is also subject to a total circulation prohibition but not as severe as for the building since non-compliance therewith, though risky, does not necessarily lead to an accident, and, of a third category of elementary zone 22 which corresponds to the circulation areas affording access to the movable gangways and which are subject to a circulation prohibition save for express permission granted by the ground traffic control authority.

Figure 7A:
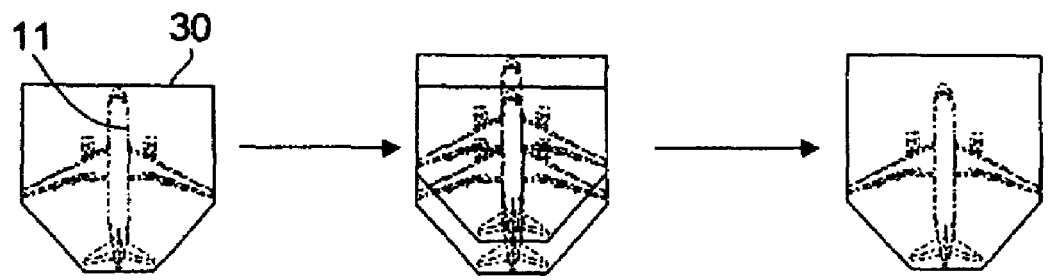
FIGS. 7a, 7b and 7c show a way of plotting a girth surface around an aircraft.
Figure 7B:
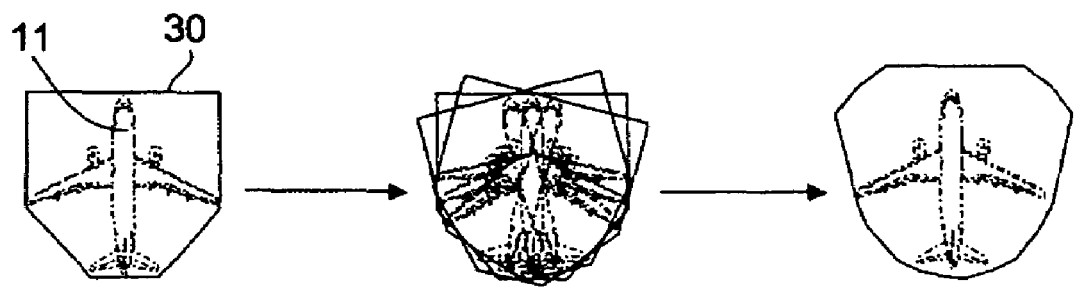
Figure 7C:
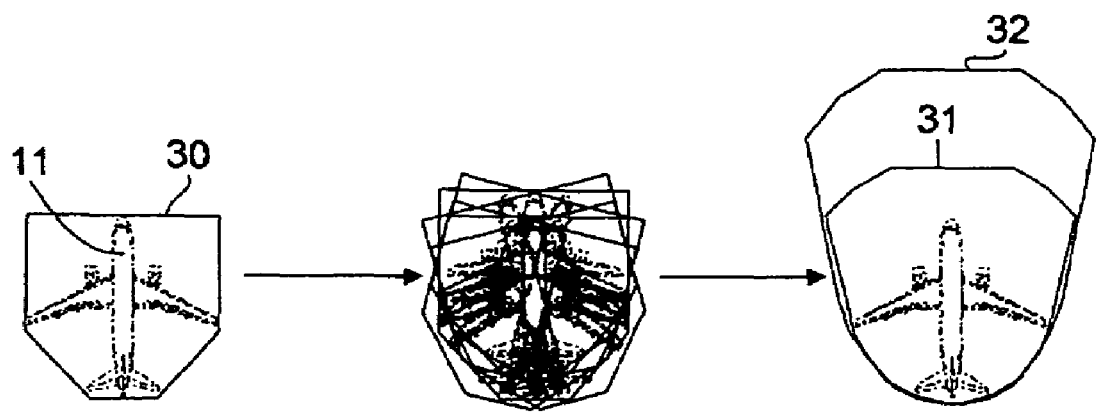

FIGS. 7a, 7b, 7c show a way of determining the contour of the girth surface 12 of a craft, here an aircraft 11. This girth surface 12 is the surface swept by a substantially square form 30, with two folded-back edges, and in which is inscribed a transport aircraft whose length is substantially equal to the wing span, displaced longitudinally, as shown in FIG. 7a, so as to take account of an uncertainty in position due to the speed of taxiing, and angularly, as shown in FIG. 7b, to take account of an uncertainty in heading due to the angular rate of change of heading. As shown in FIG. 7c, these two displacements combined lead to the girth surface 12 being given a contour 31 exhibiting resemblances with that of a Saint Jacques shell or coat of arms for craft of the aircraft type. For craft of the car or lorry type the resulting contour is in general close to a rectangle. This contour 31 may also depend on the speed of taxiing of the aircraft and, as represented at 32, have a forward front which recedes from the aircraft 11 as the latter picks up speed. Longitudinal and transverse margins may also be added so as to give a passage tolerance.

Figure 8:
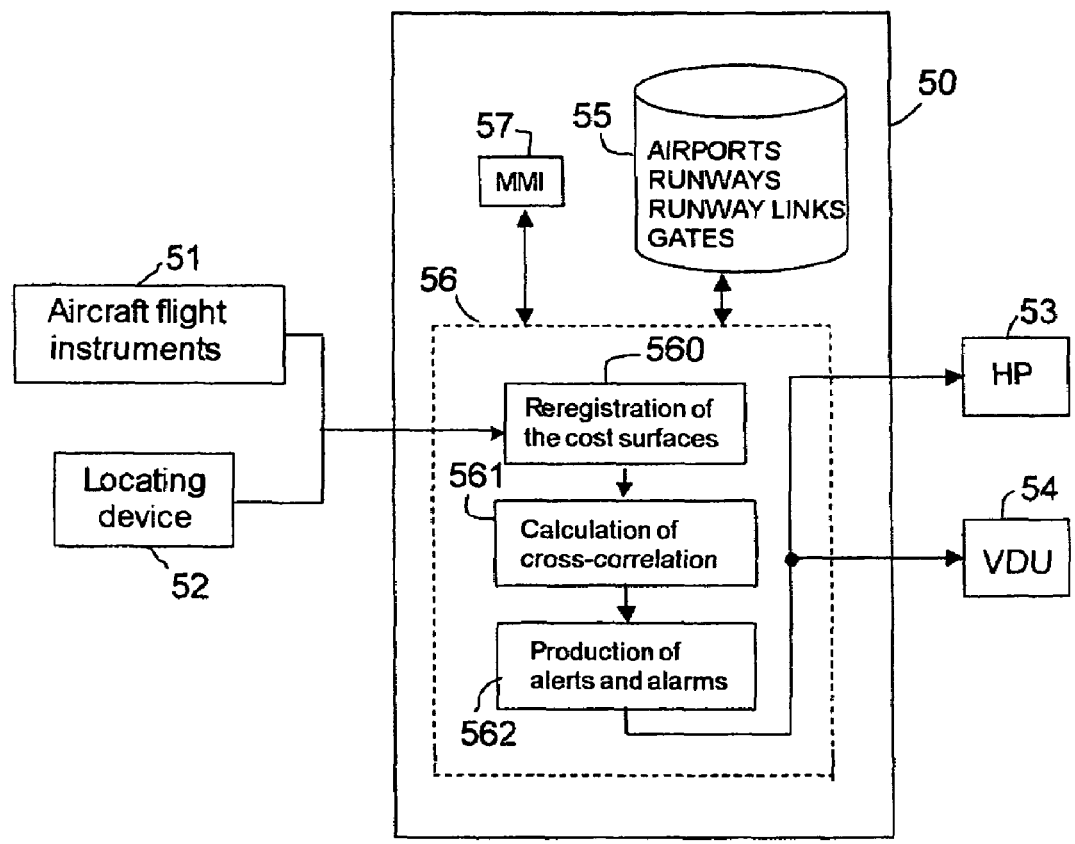
FIG. 8 is a diagram of a device according to the invention, for aiding the circulation of a craft on the surface of an airport.

As shown in FIG. 8, an onboard device for aiding airport navigation 50 is inserted into the onboard equipment of an aircraft between the flight instruments 51, a geographical locating device 52, for example a receiver of a GNSS satellite positioning system (the acronym standing for the expression: "Global Navigation Satellite System") such as GPS (the acronym standing for the expression: "Global Positioning System") possibly being used moreover by a flight management computer (not represented), possibly supplemented with other systems (not represented) for precise positioning (such as sensors for following lines on the ground), and alert emitters placed in the cockpit, either of audible or vocal type 53: loudspeaker (HP), siren, buzzer, etc., or of visual type 54: indicator light, message or graphical or symbolic indication on a risk map display screen, etc. It comprises chiefly:

an airport database 55 enclosing partitionings into elementary circulation constraint zones of the topology of the airports frequented by the aircraft, a computer 56 utilizing the information originating from the flight instruments 51, from the geographical locating device 52 and from the airport database 55 to produce reminder alerts of the local circulation constraints, relayed to the cockpit by the alert and alarm emitters 53, 54, and, advantageously:

a man/machine interface MMI 57, for example an MCDU (the acronym standing for the expression: "Multipurpose Control Display Unit") allowing parameter setting by a member of the crew of the aircraft or of a maintenance team, a datalink 58 for updating data of the airport database with the help of information transmitted by ground systems managed in general by the airport authorities or the air traffic control.

The computer 56 is configured to implement a method of aiding airport navigation comprising the following successive steps:

reregistration, at 560, of a girth surface related to the aircraft with respect to the partitioning, into elementary circulation constraint zones, of the circulation surfaces of the airport where the aircraft is presumed to be moving, with the help of the information regarding the position, the heading and possibly the speed of the aircraft, as provided by the flight instruments 51, the locating device 52, and with the help of the information contained in the airport database 55, detection by intersection logic, at 561, of the encroachments of the girth surface related to the aircraft into the elementary navigation constraint zones of the partitioning of the circulation surfaces of the airport, and production, at 562, if an encroachment of an elementary zone is detected, of reminder alerts of the set of circulation constraints in force in the elementary zone concerned.

With such a device, the pilot of a craft moving among the circulation surfaces of an airport is alerted as soon as his route leads him to have to comply with a new circulation constraint. This alert, which specifies the new constraint to be complied with as a priority, arouses his attention and leads him to ask himself whether he has indeed obtained the necessary authorizations and, in the opposite case, whether he has not gone wrong, thereby giving him the possibility of reacting before his manoeuvre endangers his safety and that of the other craft moving in his vicinity. In an airport environment, the device allows an aircraft pilot to be mindful of an abnormal situation such as an excessive proximity of his aircraft in relation to air terminals, boarding gates, reporting points, runways, taxiways, etc. He is also enabled to be mindful of a route error on the ground, for example, by an alert, for the taxiway that he is approaching or attempting to follow of an encroachment prohibition or of a taxiing weight or girth restriction that is incompatible with the weight or girth of his aircraft. He may even be warned of an incompatibility of the situation of his aircraft with respect to the taxiing authorizations delivered by the traffic control authority, if these taxiing authorizations received by phone or by digital transmission are exploited in order to keep up-to-date the elementary constrained-circulation zones.

The invention claimed is:

1. A method for aiding the flow of a craft on the surface of an airport subject to local flow constraints, the craft being provided with a geographical locating rig and with an airport database cataloguing the flow surfaces of the airport and the associated local flow constraints, comprising the following steps:

partitioning of the flow surfaces of the airport into elementary flow constraint zones each enclosing a set of adjoining points subject to the same local flow constraints, identifying the elementary zones and specific flow constraints thereof, detecting encroachment of the craft into the elementary zones, by likening the craft to a girth surface encompassing its current position and by searching for the intersections of a girth surface with a set of elementary zones of the flow surfaces of the airport, and upon each encroachment of the craft into an elementary zone providing a reminder to a commander of the craft, of a flow constraints specific to the elementary zone concerned.

2. The method according to claim 1, wherein the sensitivity of the encroachment detection is adjusted by means of a threshold dependent on the magnitude of the surface of an intersection.

3. The method according to claim 1, wherein the search for the intersections of the girth surface of the craft with the elementary zones is done by charting the girth surface and the elementary zones on one and the same geographical locating grid and by searching for the existence of a mesh cell of the grid common to the girth surface and to an elementary zone.

4. The method according to claim 3, wherein a minimum number of common mesh cells is taken as threshold of detection of encroachment of the craft into an elementary zone.

5. The method according to claim 1, wherein an elementary flow constraint zone is identified by the most restrictive flow constraint affecting it.

6. The method according to claim 1, wherein the flow constraints taken into account include several levels of severity of prohibition.

7. The method according to claim 1, wherein certain flow constraints taken into account take account of the characteristics of the craft.

8. The method according to claim 1, wherein the shape and the dimensions of the girth surface take account of the movement of the craft.

9. The method according to claim 1, wherein the shape and the dimensions of the girth surface take account of the uncertainties in the determination of the position and of the heading of the craft.

10. A device including a computer system configured for aiding the flow of a craft on the surface of an airport subject to local flow constraints, the craft being provided with a geographical locating rig and with an airport database cataloguing the flow surfaces of the airport and the associated flow constraints, formulating unit for formulating on the basis of the elements of the airport database, a partitioning of the flow surfaces of the airport into elementary flow constraint zones each enclosing a set of adjoining points subject to the same local flow constraints, an identifying unit for identifying the elementary zones and their specific flow constraints, a formulating unit for formulating a girth surface related to the craft, encompassing its current position, a likening unit for likening the encroachment of the craft into the elementary zones to the intersections of the girth surface with the set of elementary zones of the flow surfaces of the airport and wherein upon each encroachment of the craft into an elementary zone, a generating unit generates an alert reminding the commander of the craft of one of the flow constraints of the elementary zone concerned.

* * * * *